(12) United States Patent
Casebolt et al.

(10) Patent No.: US 8,811,005 B2
(45) Date of Patent: Aug. 19, 2014

(54) CLUTCH FEATURES OF A PORTABLE COMPUTING DEVICE

(75) Inventors: Matthew P. Casebolt, Fremont, CA (US); Gavin J. Reid, Campbell, CA (US); Charles A. Schwalbach, Menlo Park, CA (US); Brandon S. Smith, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 13/492,729

(22) Filed: Jun. 8, 2012

(65) Prior Publication Data

US 2013/0327556 A1 Dec. 12, 2013

(51) Int. Cl.
*G06F 1/16* (2006.01)

(52) U.S. Cl.
USPC .................. 361/679.28; 312/319.6; 174/73.1; 345/107

(58) Field of Classification Search
USPC ............. 312/223.1, 223.2, 319.6, 334.1, 323, 312/293.1, 237, 319.2, 231.1, 231.2, 245, 312/265.6; 361/679.36, 679.55, 679.28, 361/679.09, 679.02, 679.27, 679.54, 361/679.11, 679.47, 679.15, 679.01, 361/679.08, 679.17, 679.22, 679.23, 361/679.24, 679.25, 679.26, 679.33, 361/679.48; 174/82, 74 R, 70 R, 111 FF, 174/117 R, 5 R, 19, 73.1; 345/156, 179, 183, 345/659, 107, 905, 161, 173, 175, 168, 212, 345/169, 101; 248/70, 206.5, 301, 541, 248/311.2
See application file for complete search history.

(56) References Cited

U.S. PATENT DOCUMENTS

2013/0286578 A1* 10/2013 Degner et al. ............ 361/679.28
2013/0329354 A1* 12/2013 Knopf et al. ............. 361/679.36

* cited by examiner

*Primary Examiner* — Hung Duong
(74) *Attorney, Agent, or Firm* — Womble Carlyle Sandridge & Rice LLP

(57) ABSTRACT

A portable computing device can include one or more clutch assemblies that can include a conductive elastomer configured to contact at least a portion of the clutch assembly of the portable computing device. The conductive elastomer can be configured to also contact at least one region of the base portion of the portable computing device. In one embodiment, the conductive elastomer can be disposed on the clutch assembly. The conductive elastomer can enhance an electrical coupling between two or more regions of the base portion, especially in the region near the conductive elastomer and the clutch assembly. The enhanced coupling can increase a performance of an electrical shield provided by the two or more regions of the base portion.

18 Claims, 12 Drawing Sheets

US 8,811,005 B2

CLUTCH FEATURES OF A PORTABLE COMPUTING DEVICE

TECHNICAL FIELD

The present invention relates generally to portable computing devices. More particularly, the present embodiments relate to clutch features of portable computing devices configured to allow increased electrical shielding.

BACKGROUND

A portable computing device can include an enclosure configured to contain the various components that make up the device. A typical computing device can include a central processing unit, a mass storage device, a display and still other electrical devices. Each electrical device can also generate electrical noise. The emission and conduction of electrical noise (often referred to as electromagnetic radiation, or EMI) is commonly monitored and regulated by regional agencies.

The enclosure of the portable computing device can be a first line of defense in the battle of EMI reduction. If there are any poor electrical couplings between two or more parts that make up the enclosure of the portable computing device, then EMI noise can sometimes more readily escape, especially in those regions.

Therefore, what is needed is a way to reduce unwanted electrical noise from components within a portable computing device, particularly in targeted regions of the enclosure.

SUMMARY

The present application describes various embodiments regarding systems and methods for reducing EMI interference and/or emissions by enhancing an electrical coupling of two or more portions of a base portion of a portable computing device in a region near a clutch assembly. In one embodiment, a clutch assembly can include a cylindrical portion comprising an annular outer region and a central bore region, a fastening region and a conductive elastomer that can be disposed on the clutch assembly and configured to enhance an electrical contact between the clutch assembly and at least one portion of the base portion.

A conductive elastomer is disclosed. The conductive elastomer can include a cavity to conform to at least one portion of the clutch assembly and a first lobe that is configured to couple the clutch assembly to a region of the base portion of the portable computing device. In one embodiment, the conductive elastomer can include silver loaded silicone material.

A method is disclosed for enhancing an electrical coupling between top case and bottom case portions of a base portion of a portable computing device. The method can include the steps of receiving the top case and bottom case, coupling a clutch assembly to the top case, attaching a conductive elastomer to the clutch assembly, preparing the bottom case to enhance conductivity and attaching the bottom case to the top case.

A conductive end cap for a portable computing device can enhance an electrical coupling between parts of a base of a portable computing device and reduce the visibility of internal components of the portable computing device from outside the device.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Figure 1:
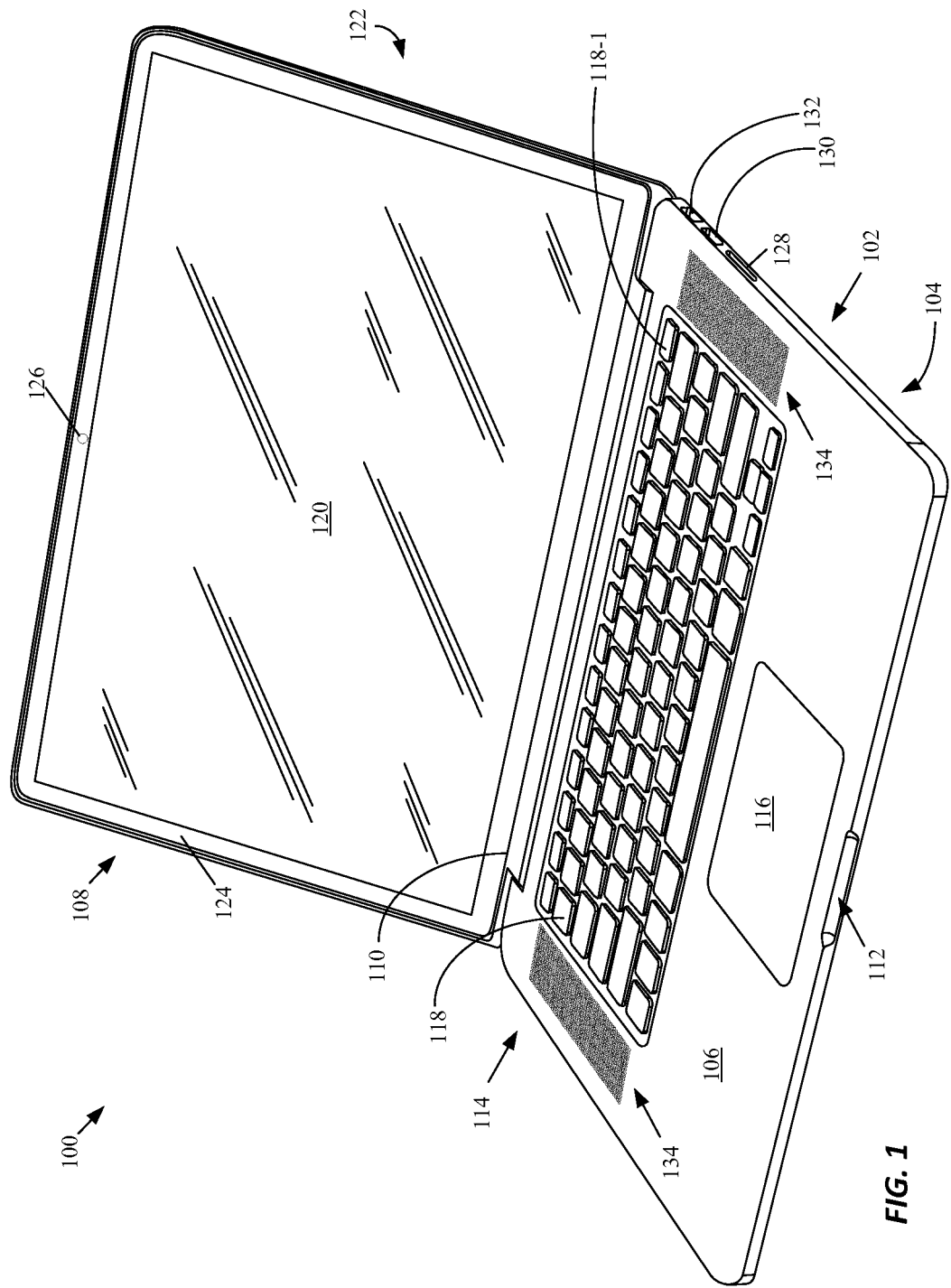
FIG. 1 shows a front facing perspective view of an embodiment of the portable computing device in the form of portable computing device in an open (lid) state.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

In a particular embodiment, the lid and base portion can be pivotally connected with each other by way of what can be referred to as a clutch assembly. The clutch assembly can be arranged to pivotally couple the base portion to the lid. The clutch assembly can include at least a cylindrical portion that in turn includes an annular outer region, and a central bore region surrounded by the annular outer region, the central bore suitably arranged to provide support for electrical conductors between the base portion and electrical components in the lid. The clutch assembly can also include a plurality of fastening regions that couple the clutch to the base portion and the lid of the portable computing device with at least one of the fastening regions being integrally formed with the cylindrical portion such that space, size and part count are minimized.

The multipart housing can be formed of a strong and durable yet lightweight material. Such materials can include composite materials and or metals such as aluminum. Aluminum has a number of characteristics that make it a good choice for the multipart housing. For example, aluminum is a good electrical conductor that can provide good electrical ground and it can be easily machined and has well known metallurgical characteristics. The superior conductivity of aluminum provides a good chassis ground for internal electrical components arranged to fit and operate within the housing. The aluminum housing also provides a good electromagnetic interference (EMI) shield protecting sensitive electronic components from external electromagnetic radiation as well as reducing electromagnetic radiation emanating from the portable computing device. In one aspect of the provided embodiments, the computing device takes the form of a laptop computer.

The base portion can include a top case and a bottom case formed of conductive material. In one embodiment, the base portion can include a conductive elastomer configured to improve electrical coupling between the top case and the bottom case in at least one region. Improving electrical coupling between the top case and the bottom case can improve EMI shield performance.

These and other embodiments are discussed below with reference to FIGS. 1-11. However, those skilled in the art will readily appreciate that the detailed description given herein with respect to these figures is for explanatory purposes as the invention extends beyond these limited embodiments.

FIGS. 1-11 show various views of the portable computing device in accordance with various embodiments. FIG. 1 shows a front facing perspective view of an embodiment of the portable computing device in the form of portable computing device 100 in an open (lid) state. Portable computing device 100 can include base portion 102 formed of bottom case 104 fastened to top case 106. Base portion 102 can be pivotally connected to lid portion 108 by way of clutch assembly 110 hidden from view by a cosmetic wall. Base portion 102 can have an overall uniform shape sized to accommodate clutch assembly 110 and inset portion 112 suitable for assisting a user in lifting lid portion 108 by, for example, a finger. Top case 106 can be configured to accommodate various user input devices such as keyboard 114 and touchpad 116. Keyboard 114 can include a plurality of low profile keycap assemblies each having an associated key pad 118. In one embodiment, an audio transducer (not shown) can use selected portions of keyboard 114 to output audio signals such as music. In the described embodiment, a microphone can be located at a side portion of top case 106 that can be spaced apart to improve frequency response of an associated audio circuit.

Each of the plurality of key pads 118 can have a symbol imprinted thereon for identifying the key input associated with the particular key pad. Keyboard 114 can be arranged to receive a discrete input at each keypad using a finger motion referred to as a keystroke. In the described embodiment, the symbols on each key pad can be laser etched thereby creating an extremely clean and durable imprint that will not fade under the constant application of keystrokes over the life of portable computing device 100. In order to reduce component count, a keycap assembly can be re-provisioned as a power button. For example, key pad 118-1 can be used as power button 118-1. In this way, the overall number of components in portable computing device 100 can be commensurably reduced.

Touch pad 116 can be configured to receive finger gesturing. A finger gesture can include touch events from more than one finger applied in unison. The gesture can also include a single finger touch event such as a swipe or a tap. The gesture can be sensed by a sensing circuit in touch pad 116 and converted to electrical signals that are passed to a processing unit for evaluation. In this way, portable computing device 100 can be at least partially controlled by touch.

Lid portion 108 can be moved with the aid of clutch assembly 110 from the closed position to remain in the open position and back again. Lid portion 108 can include display 120 and rear cover 122 (shown more clearly in FIG. 2) that can add a cosmetic finish to lid portion 108 and also provide structural support to at least display 120. In the described embodiment, lid portion 108 can include mask (also referred to as display trim) 124 that surrounds display 120. Display trim 124 can be formed of an opaque material such as ink deposited on top of or within a protective layer of display 120. Display trim 124 can enhance the overall appearance of display 120 by hiding operational and structural components as well as focusing attention onto the active area of display 120.

Display 120 can display visual content such as a graphical user interface, still images such as photos as well as video media items such as movies. Display 120 can display images using any appropriate technology such as a liquid crystal display (LCD), OLED, etc. Portable computing device 100 can also include image capture device 126 located on a transparent portion of display trim 124. Image capture device 126 can be configured to capture both still and video images. Lid portion 108 can be formed to have uni-body construction that can provide additional strength and resiliency to lid portion 108 which is particularly important due to the stresses caused by repeated opening and closing. In addition to the increase in strength and resiliency, the uni-body construction of lid portion 108 can reduce overall part count by eliminating separate support features.

Data ports 128-132 can be used to transfer data and/or power between an external circuit(s) and portable computing device 100. Data ports 128-132 can include, for example, input slot 128 that can be used to accept a memory card (such as a FLASH memory card), data ports 130 and 132 can take be used to accommodate data connections such as USB, FireWire, Thunderbolt, and so on. In some embodiments, speaker grid 134 can be used to port audio from an associated audio component enclosed within base portion 102.

Figure 2:
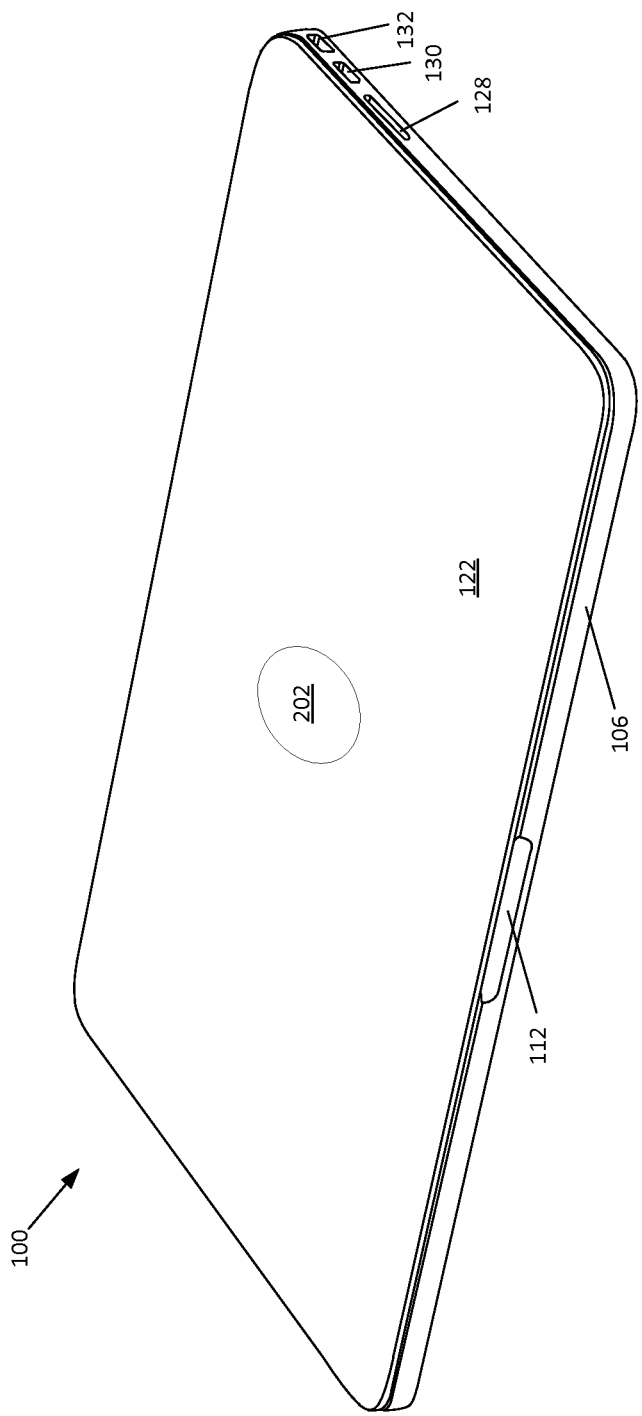
FIG. 2 shows portable computing device in a closed (lid) configuration that shows rear cover and logo.

FIG. 2 shows portable computing device 100 in a closed (lid) configuration that shows rear cover 122 and logo 202. In one embodiment, logo 202 can be illuminated by light from display 120. It should be noted that in the closed configuration, lid portion 108 and base portion 102 form what appears to be a uniform structure having a continuously varying and coherent shape that enhances both the look and feel of portable computing device 100.

Figure 3:
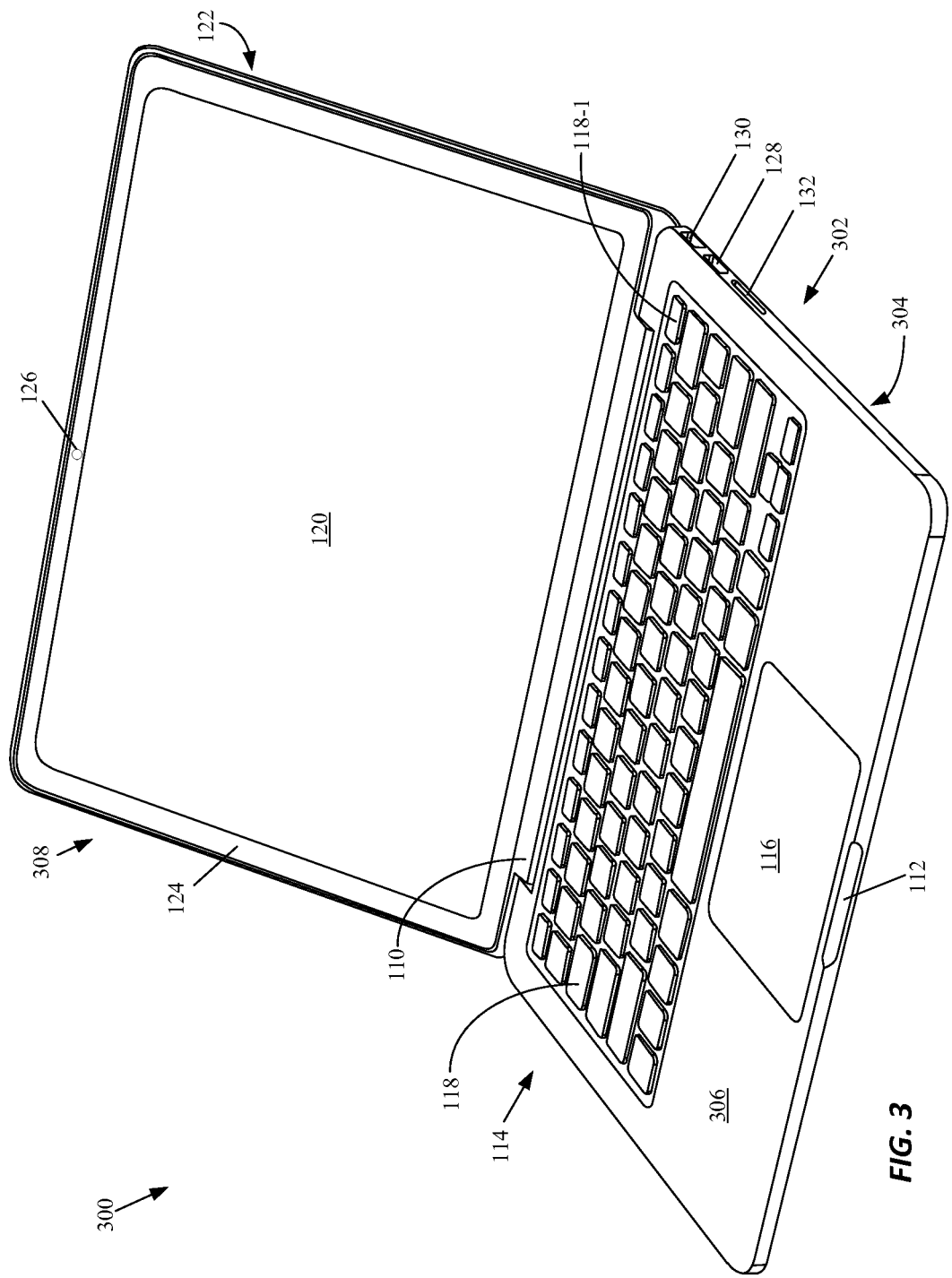
FIG. 3 shows another embodiment of the portable computing device in the form of portable computing device also in the open state.

FIG. 3 shows another embodiment in the form of portable computing device 300 that is smaller than portable computing device 100. Since portable computing device 300 is smaller in size than portable computing device 100, certain features shown in FIG. 1 are modified, or in some cases lacking, in portable computing device 300. For example, base portion 302 can be reduced in size such that separate speakers (such as speaker grid 134) are replaced with an audio port embodied as part of keyboard 114. However, bottom case 304 and top case 306 can retain many of the features described with regards to portable computing device 100 (such as display 120 though reduced to an appropriate size).

Figure 4:
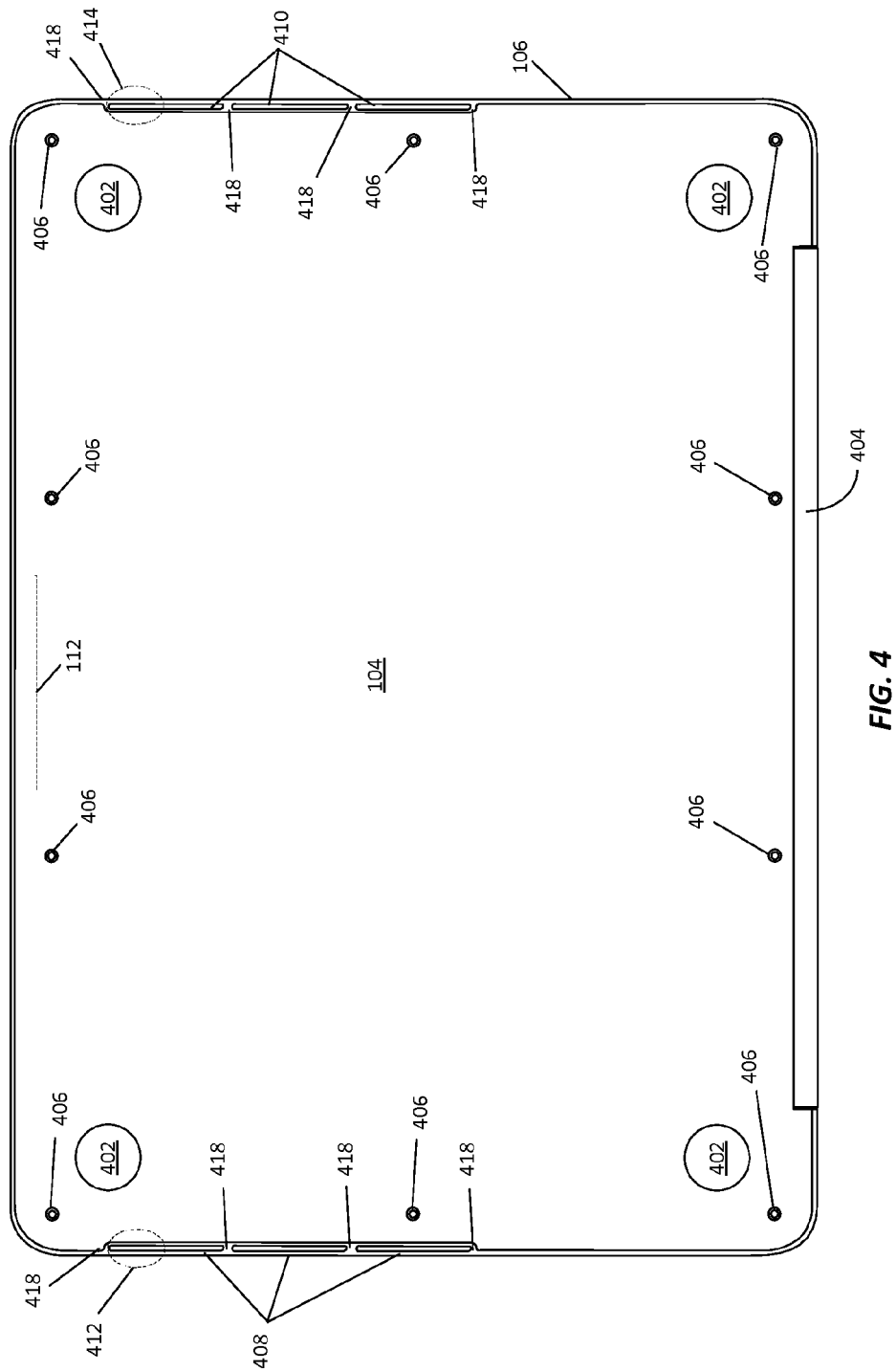
FIG. 4 shows an external view of bottom case.

FIG. 4 shows an external view of bottom case 104 showing relative positioning of support feet 402, insert 112, cosmetic wall 404 that can be used to conceal clutch assembly 110 and fasteners 406 used to secure bottom case 104 and top case 106 together. Support feet 402 can be formed of wear resistant and resilient material such as plastic. Also in view are multipurpose front side sequentially placed vents 408 and 410 that can be used to provide a flow of outside air that can be used to cool internal components. In the described embodiment, vents 408 and 410 can be placed on an underside of top cover 106 in order to hide the vents from view as well as obscure the view of an interior of portable computing device 100 from the outside. Vents 408 and 410 can act as a secondary air intake subordinate to primary air intake vents located at a rear portion of portable computing device 100 (described below). In this way, vents 408 and 410 can help to maintain an adequate supply of cool air in those situations where portions of the rear vents are blocked or otherwise have their air intake restricted.

Vents 408 and 410 can also be used to output audio signals in the form of sound generated by an audio module (not shown). In one embodiment, a selected portion (such as portions 412 and 414) can be used to output sound at a selected frequency range in order to improve quality of an audio presentation by portable computing device 100. Vents 408 and 410 can be part of an integrated support system in that vents 408 and 410 can be machined from the outside and cut from the inside during fabrication of top case 106. As part of the machining of vents 408 and 410, stiffener ribs 418 can be placed within vent openings 408 and 410 to provide additional structural support for portable computing device 100. Stiffener ribs 418 can be formed using what is referred to as a T cutter that removes material subsequent to the formation of the vent openings during the fabrication of top case 106.

Figure 5:
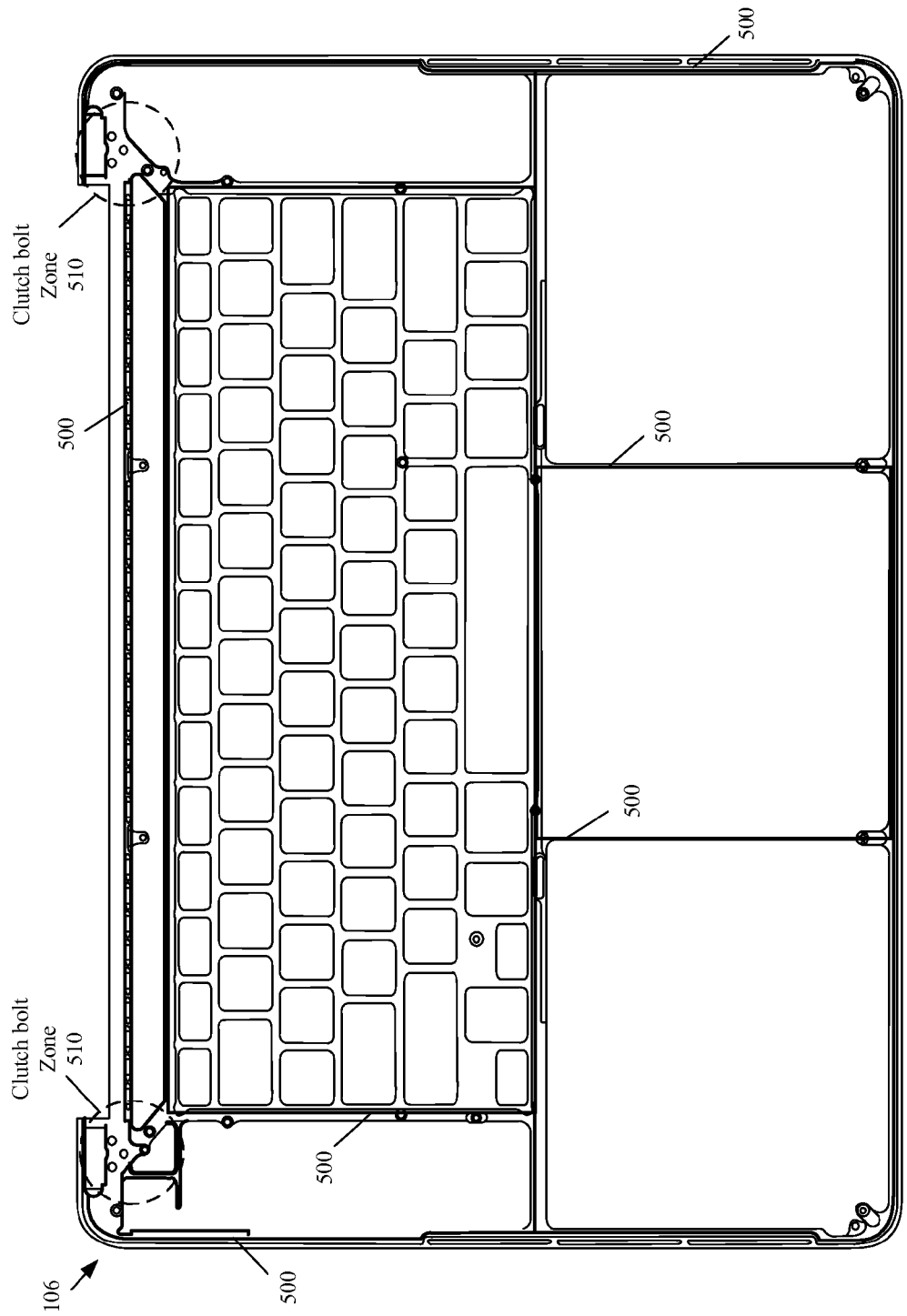
FIG. 5 shows integrated support system in accordance with the described embodiments.

FIG. 5 shows integrated support system 500 in accordance with the described embodiments. In order to enhance the structural integrity, reduce bowing, and improve resistance to infrequent but potentially damaging events such as being dropped, top case 106 can be fabricated to include integrated support system 500. Top case 106 can include clutch bolt zone 510. In one embodiment, stresses imparted to a clutch assembly affixed in the region of clutch bolt zone 510 can be advantageously distributed throughout regions in top case 106 through integrated support system 500.

Figure 6:
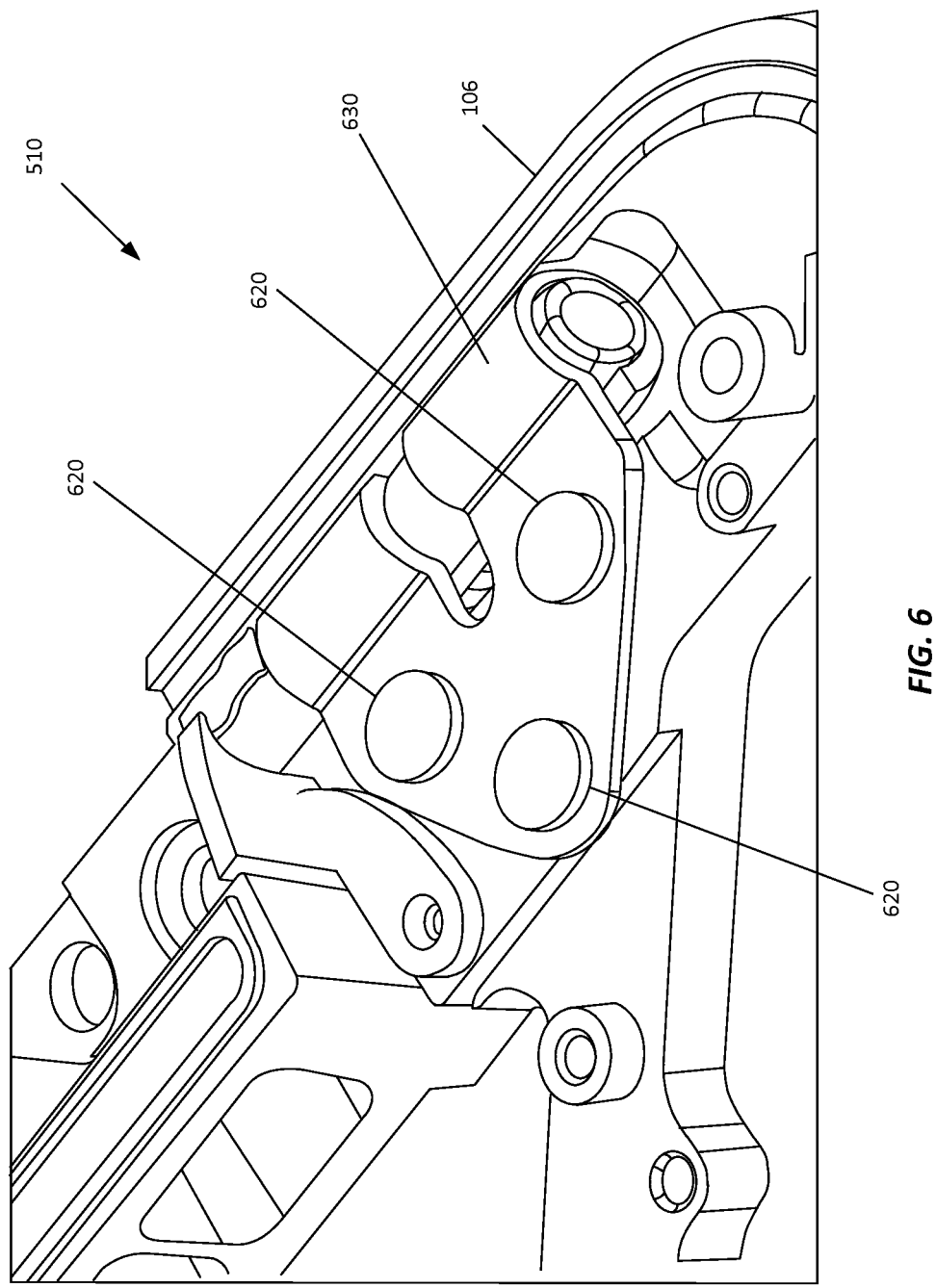
FIG. 6 is an illustration of the clutch bolt zone accordance with one embodiment of the specification.

FIG. 6 is an illustration of clutch bolt zone 510 accordance with one embodiment of the specification. Clutch bolt zone 510 shows an exemplary clutch assembly 630 affixed to top case 106 with screws 620. In other embodiments, clutch assembly 630 can be attached with rivets, other fasteners, adhesives or clutch assembly 630 can be welded to top case 106. In some embodiments, electrical noise can be present in top case 106 near clutch assembly 630. Electrical noise can be attenuated, at least to some degree, by forming a shield (such as a Faraday cage) in an area near clutch assembly 630. Top case 106 and bottom case 104 can form such a shield when the top case 106 and bottom case 104 are made from conductive material or the case material made conductive through conductive paints or liners. Additionally, top case 106 and bottom case 104 can be coupled to ground (signal or chassis) to enhance the performance of the EMI shield.

Although top case 106 and bottom case 104 are formed of conductive material, increasing electrical coupling between top and bottom cases 106, 104 can further enhance shielding properties. In one embodiment, a conductive elastomer can be used to enhance the electrical coupling between top case 106 and bottom case 104 by providing an electrical path through clutch assembly 630.

FIGS. 7A-7D are views of a conductive elastomer configured to enhance the electrical coupling between the two piece case of portable computing device 100. The conductive elastomer can be affixed to one of the case pieces, or to an assembly that is in turn affixed to one of the case pieces. In one embodiment, the conductive elastomer can be formed from a silver loaded silicone. In another embodiment, the conductive elastomer can be formed from styrene, nitrile, neoprene or other compliant material that can be made conductive with an addition silver, copper, aluminum or any other technically feasible material. The selected materials forming the conductive elastomer provide a solid yet compliant elastomer that can deform at least partially when compressed. In one embodiment, the deformation can allow the elastomer to better conform to parts such as the clutch assembly 630 and bottom case 104.

Figure 7A:
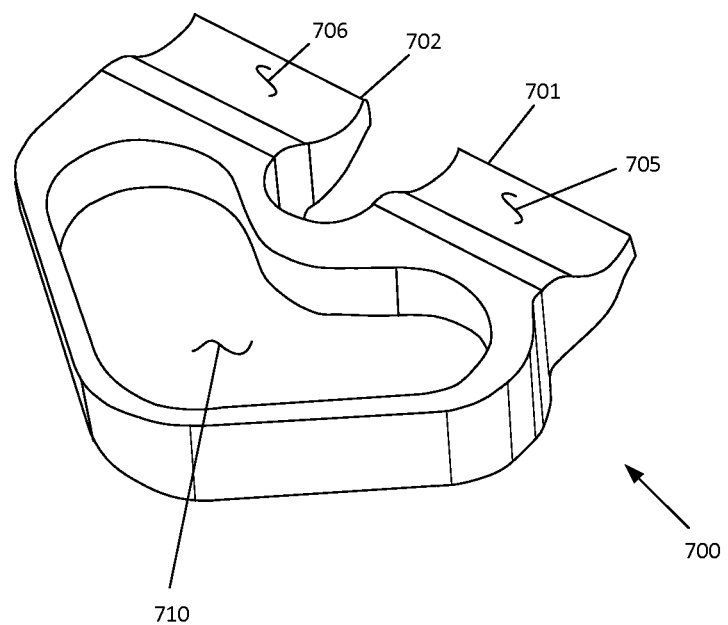
FIGS. 7A-7D are views of a conductive elastomer configured to enhance the electrical coupling between the two piece case of portable computing device.

FIG. 7A is a bottom view of one embodiment of a conductive elastomer 700. The conductive elastomer 700 can include a first lobe 701, a second lobe 702 and a cavity 710. The first 701 and second 702 lobes can each include two contact surfaces. As shown, first lobe 701 can have a bottom contact surface 705 and second lobe 702 can have a bottom contact surface 706. In one embodiment, the bottom contact surfaces 705, 706 can be configured to make electrical contact with clutch assembly 630. For example, the bottom contact surfaces 705, 706 can be shaped to closely align with clutch assembly 630 features and maximize contact surface area between clutch assembly 630 and the conductive elastomer 700. Cavity 710 can be configured to allow conductive elastomer 700 to fit closely and conform to clutch assembly 630. In one embodiment, cavity 710 can allow one or more mounting screws for clutch assembly 630 to protrude into the conductive elastomer 700. In one embodiment, an adhesive can be placed into cavity 710 to affix conductive elastomer 700 to the clutch assembly. In yet another embodiment, the adhesive can be electrically conductive.

Figure 7B:
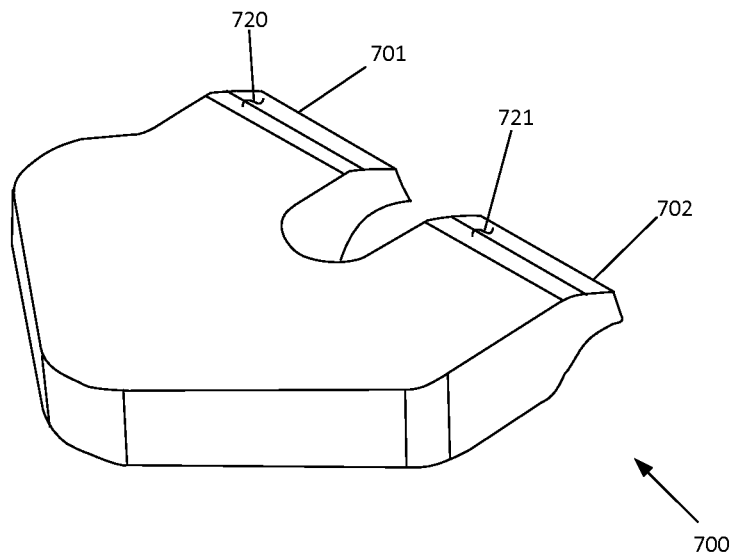

FIG. 7B is a top view of conductive elastomer 700. First lobe 701 can include top contact surface 720 and second lobe 702 can include top contact surface 721. The top contact surfaces 720, 721 can be configured to contact the bottom case 104 when attached to the top case 106. In one embodiment, top contact surfaces 720, 721 can be shaped to closely align with portions of the bottom case 106 that can contact conductive elastomer 700.

Figure 7C:
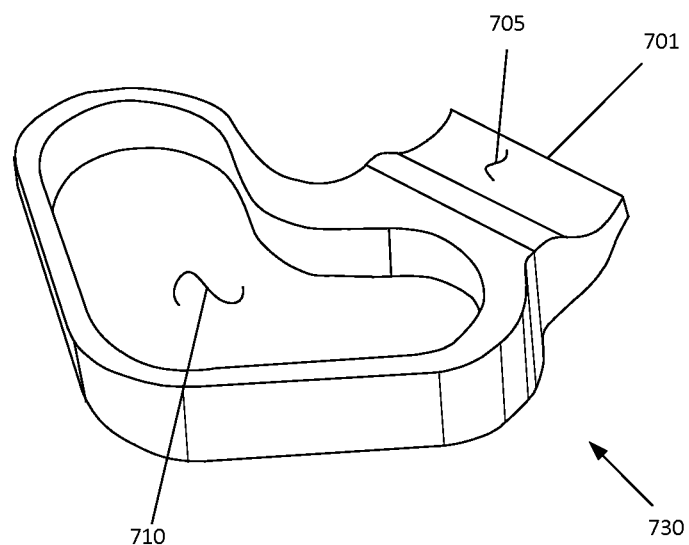
Figure 7D:
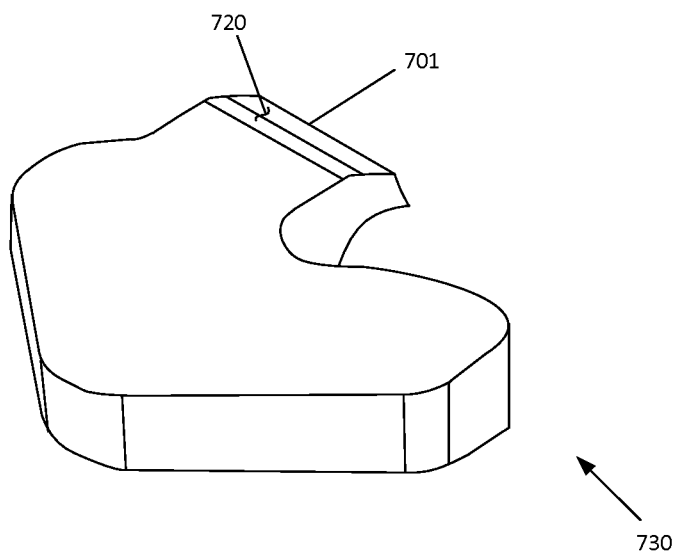

FIG. 7C is a bottom view of another embodiment of a conductive elastomer 730. Conductive elastomer 730 includes only first lobe 701. This simplified embodiment can still provide enhanced electrical coupling between top case 106 and bottom case 104. Bottom contact surface 705 is shown on underside of first lobe 701. Conductive elastomer 730 can also include cavity 710 to accommodate mounting screws or other mechanical features near clutch assembly 630. In one embodiment, cavity 710 can include an adhesive to mount and stabilize conductive elastomer 730 with respect to the clutch assembly 630. FIG. 7D is a top view of conductive elastomer 730. First lobe 701 can include top contact surface 720. Top contact surface 720 can be configured to contact the bottom case 104 as described above.

In one embodiment, a conductive elastomer can be affixed to and contact clutch assembly 630. When bottom case 104 is attached to the top case 106, the conductive elastomer can contact bottom case 104 enhancing an electrical connection between top case 104 and bottom case 106 in an area near the conductive elastomer. In embodiments where at least one of top case 106 and bottom case 104 are coupled to ground, the conductive elastomer can improve the electrical coupling between top case 106 and bottom case 104 to ground thereby improving EMI shielding, at least in the area of the conductive elastomer.

Figure 8:
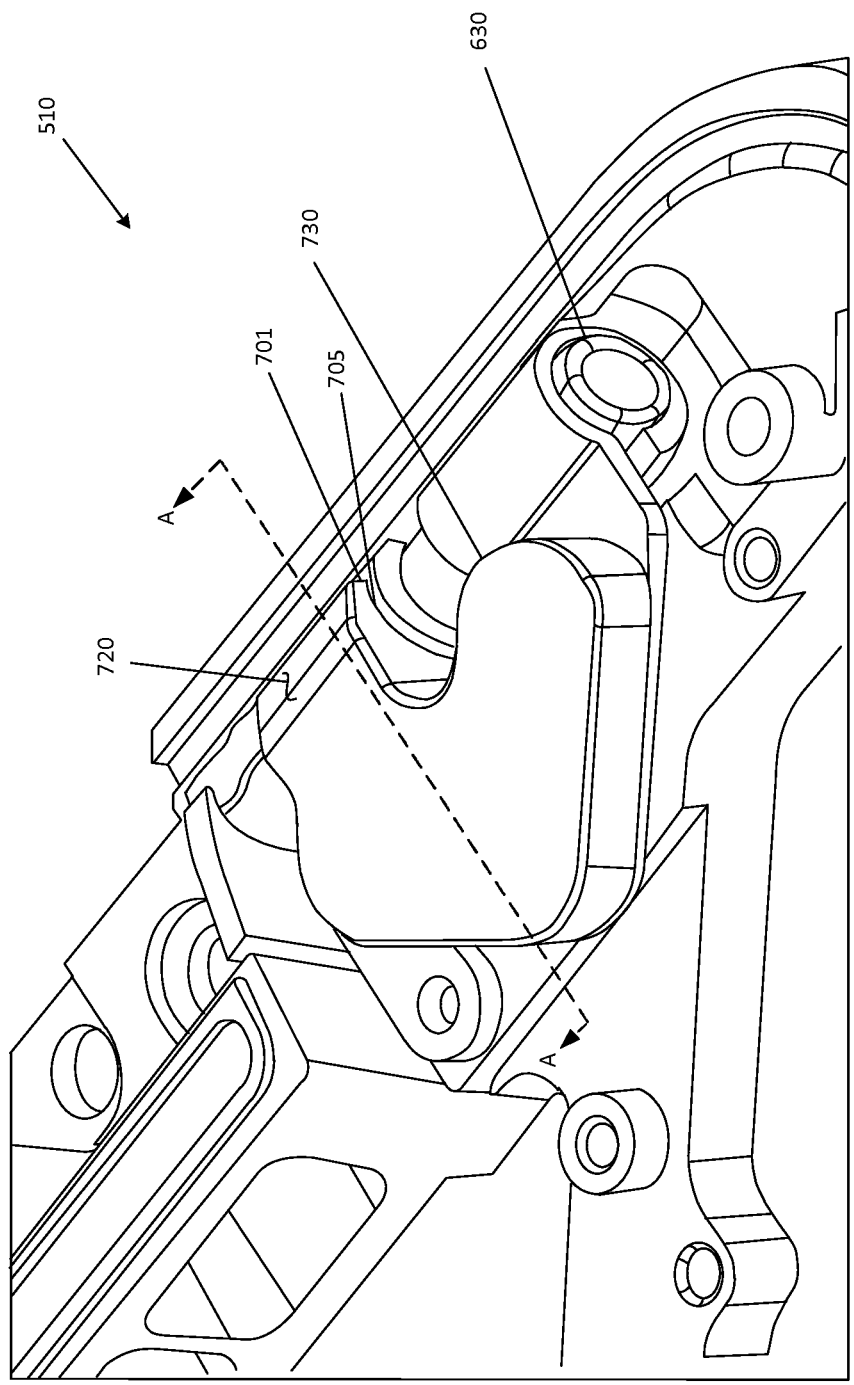
FIG. 8 is another illustration of the clutch zone in accordance with one embodiment of the specification.

FIG. 8 is another illustration of clutch zone 510 in accordance with one embodiment of the specification. As shown, conductive elastomer 730 is affixed to clutch assembly 630. First lobe 701 can be positioned over clutch assembly 630 such that bottom contact surface 705 can contact clutch assembly 630 and form an electrical path. First lobe 701 can be configured to only contact non-moving portions of clutch assembly 630. This configuration can advantageously reduce wear on conductive elastomer 730. Top contact surface 720 can be configured to contact bottom case 104 as bottom case 104 is affixed to top case 106 completing the electrical path between top case 106 and bottom case 104. In other words, an enhanced electrical path is formed from bottom case 104, through conductive elastomer 730, through clutch assembly 630 to top case 104.

Figure 9:
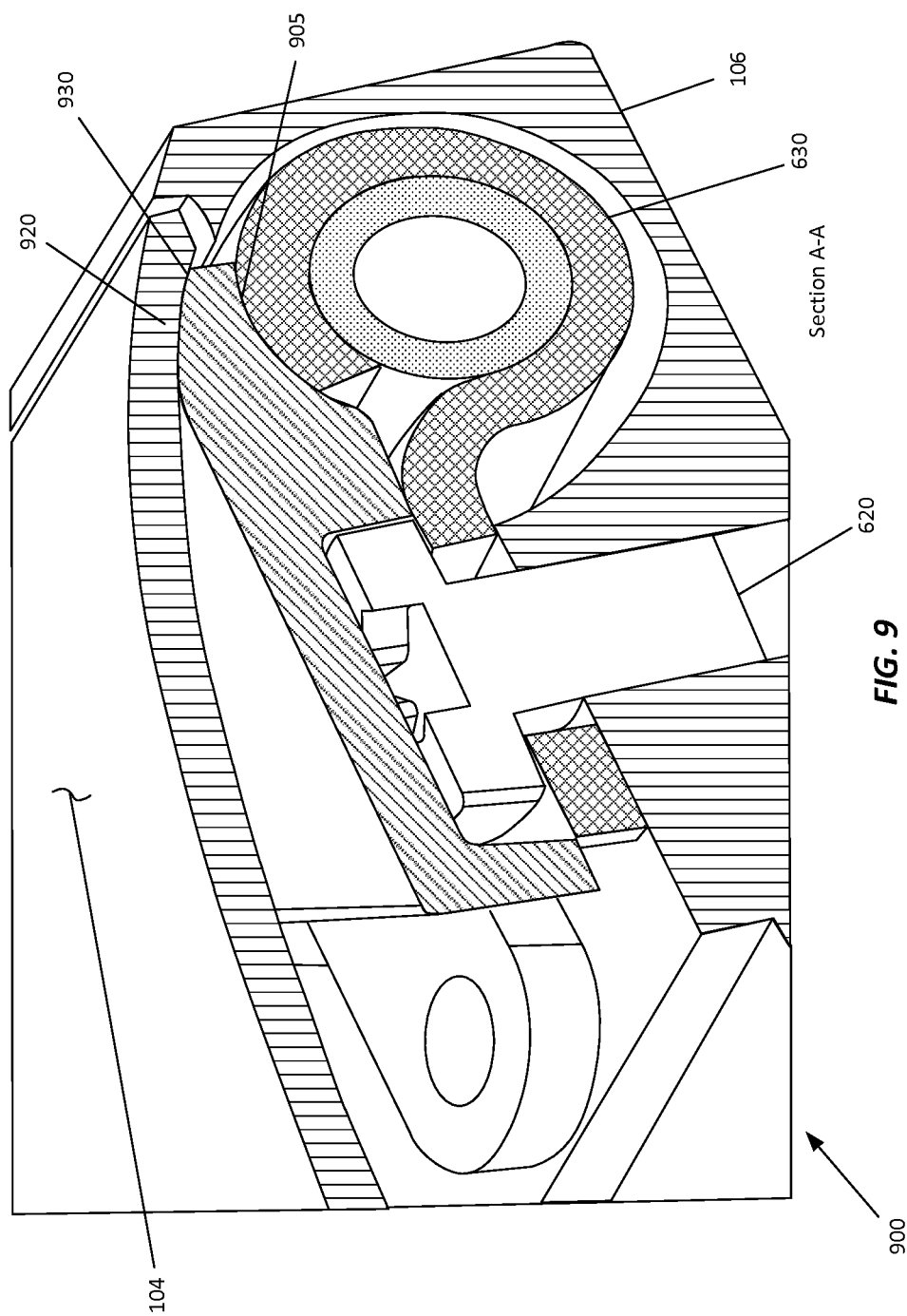
FIG. 9 is a cross section view (A-A) from FIG. 8, with bottom case affixed to top case.

FIG. 9 is a cross section view 900 (A-A) from FIG. 8, with bottom case 104 affixed to top case 106. Clutch assembly 630 is shown affixed to top case 106 by screws 620. Conductive elastomer 930 can be configured such that bottom contact 905 comes into direct contact with clutch assembly 630. Top contact 920 can come into direct contact with bottom case 104. In one embodiment, conductive elastomer 930 can deform as bottom case 104 is affixed to top case 106. Shield performance of top case 106 and bottom case 104 can be enhanced especially in the region near clutch assembly 630 by conductive elastomer 930 providing an enhanced electrical coupling between bottom case 104 and top case 106. In some embodiments, bottom case 104 can be prepared in advance of affixing to top case 106. Bottom case 104 can be anodized aluminum. Although aluminum is a good electrical conductor, the anodization layer can act as an insulator. One preparation step can include removing the anodization layer in at least the region in contact with top contact 920. In one embodiment, the anodization layer can be removed with a laser.

Figure 10:
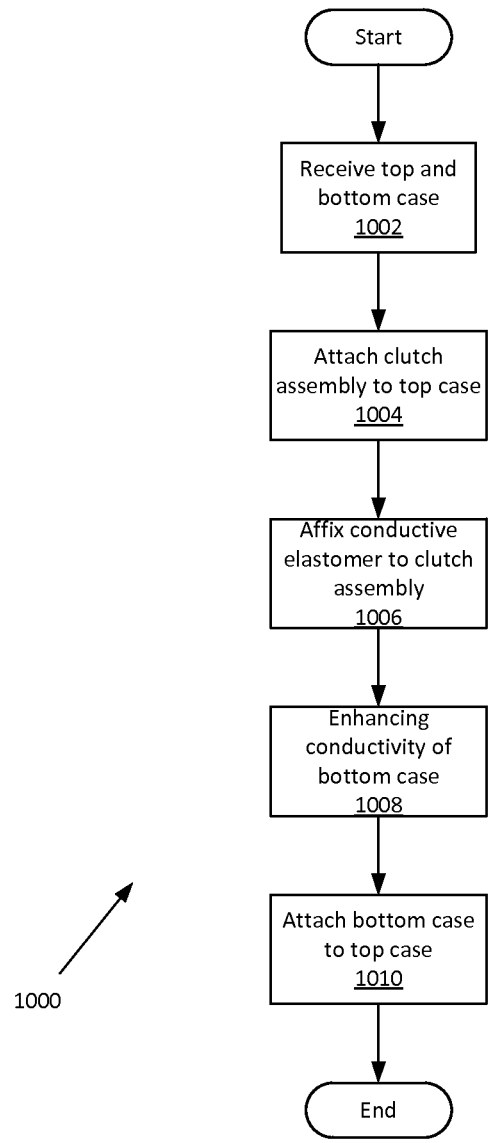
FIG. 10 is a flow chart of method steps for enhancing the electrical coupling between a top case and a bottom case of a portable computing device.

FIG. 10 is a flow chart of method steps 1000 for enhancing the electrical coupling between a top case 106 and a bottom case 104 of a portable computing device 100. Persons skilled in the art will understand that any system configured to perform the method steps in any order is within the scope of this description. The method begin in step 1002 when the top case 106 and bottom case 104 of the portable computing device 100 is received. In one embodiment, the top case 106 and bottom case 104 can be formed from anodized aluminum. In step 1004, clutch assembly 630 can be affixed to top case 106. In one embodiment, clutch assembly 630 can be affixed with screws 620 to top case 106. In step 1006, conductive elastomer 730 can be affixed to clutch assembly 630. In one embodiment, an adhesive can be disposed in cavity 710 to help secure conductive elastomer 730 to clutch assembly 630. In step 1008, the conductivity of the bottom case can be enhanced. In one embodiment, an anodization layer can be removed from at least one region of bottom case 104 to improve an electrical connection between bottom case 104 and conductive elastomer 730. In step 1010, bottom case 104 can be attached to top case 106 and the method ends.

Figure 11:
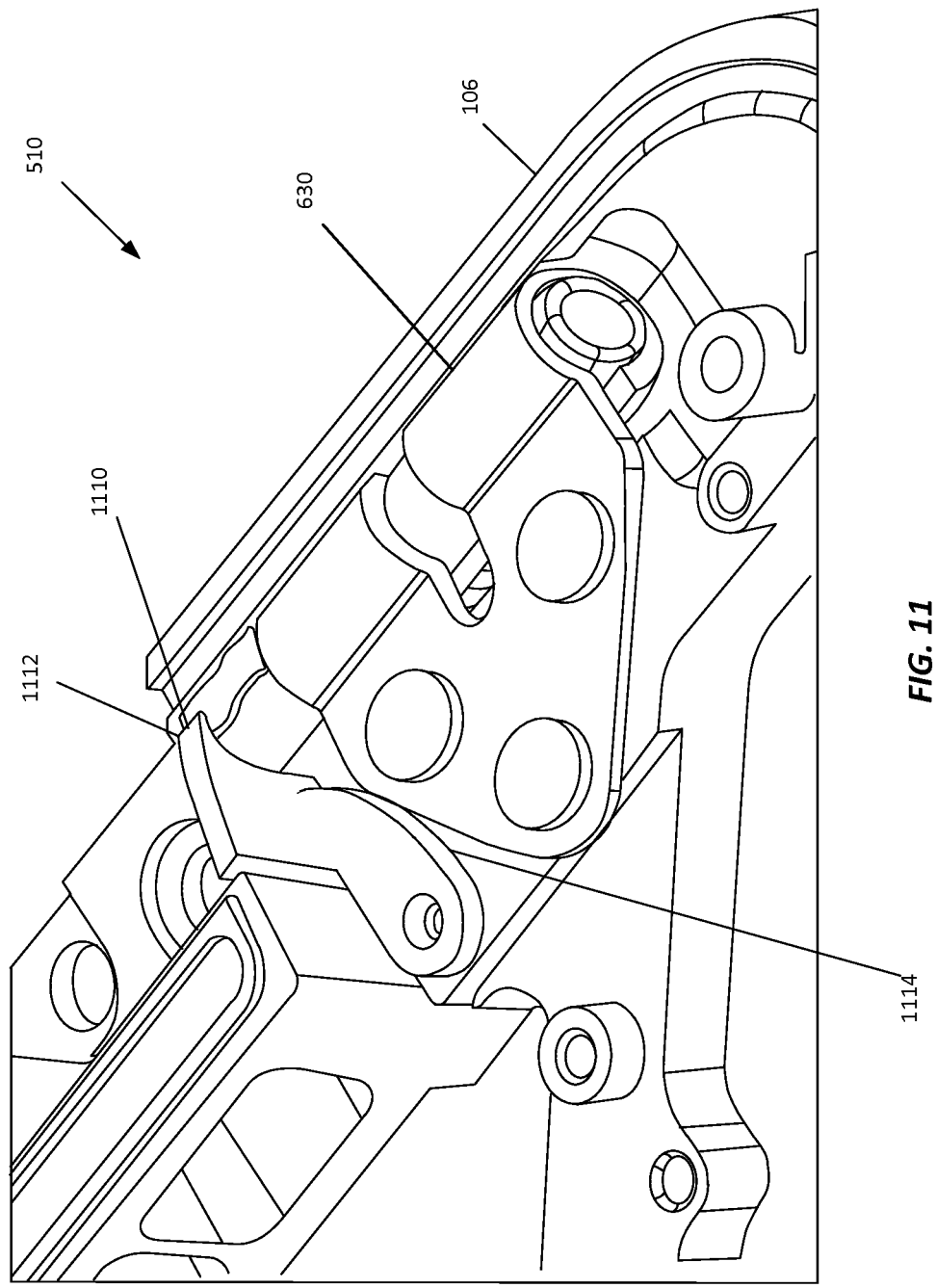
FIG. 11 is another illustration of the clutch zone in accordance with one embodiment of the specification.

FIG. 11 is another illustration of the clutch zone 510 in accordance with one embodiment of the specification. End cap 1110 can improve cosmetic appearance to portable computing device 100 by reducing the visibility of clutch assembly 630 and other internal parts from outside portable computing device 100. In one embodiment, end cap 1110 can be made conductive and be made to enhance the electrical coupling between top case 106 and bottom case 104. For example, end cap 1110 can be formed from a conductive elastomer similar to conductive elastomer 730 and can be designed to contact and deform slightly as bottom case 104 is attached to top case 106. The deformation can help enhance the conductivity between end cap 1110 and top case 106 and bottom case 104 and therefore enhance shield performance of top and bottom cases 106, 104 respectively. In one embodiment, end cap 1110 can include a first surface 1112 configured to contact bottom case 104 and a second surface 1114 configured to contact top case 106. In one embodiment, end cap 1110 can be affixed to top case 106 with a screw, rivet or any other technically feasible approach.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A clutch assembly configured for pivotally connecting a lid to a base portion of a portable computing device, comprising:
   a cylindrical portion comprising:
      an annular outer region; and
      a central bore region configured to provide support for electrical conductors between the base portion and the lid;
   at least one fastening region configured to couple the clutch assembly to the base portion; and
   a conductive elastomer disposed on the clutch assembly configured to contact the clutch assembly and at least one region of the base portion, wherein the conductive elastomer forms a conductive path between the clutch assembly and the at least one region of the base portion.

2. The clutch assembly of claim 1, wherein the conductive elastomer is formed, at least in part, from a silver loaded silicone.

3. The clutch assembly of claim 1, wherein the conductive elastomer further comprises a cavity configured to conform to at least part of the clutch assembly.

4. The clutch assembly of claim 3, wherein the conductive elastomer is configured to attach to the clutch assembly with adhesive.

5. The clutch assembly of claim 1, wherein the conductive elastomer is configured to be deformed within the base.

6. The clutch assembly of claim 1, wherein the conductive elastomer further comprises a first lobe including a first contact surface configured to conform to at least a portion of the clutch assembly.

7. The clutch assembly of claim 6, wherein the first lobe further comprises a second contact surface configured to conform to at least the one region of the base portion.

8. The clutch assembly of claim 7, wherein the conductive elastomer further comprises a second lobe configured to include a third contact surface configured to conform to at least a portion of the clutch assembly.

9. The clutch assembly of claim 8, wherein the second lobe further comprises a fourth contact surface configured to conform to at least a second region of the base portion.

10. A conductive elastomer, comprising:
    a cavity configured to conform to at least a first portion of a clutch assembly;
    a first lobe configured to electrically couple the clutch assembly to at least one region of a base portion of a portable computing device; and
    a conductive adhesive configured to affix the conductive elastomer to the clutch assembly.

11. The conductive elastomer of claim 10 wherein the conductive elastomer further comprises silver loaded silicone.

12. The conductive elastomer of claim 10, wherein the first lobe includes a first surface configured to conform to a portion of the clutch assembly.

13. The conductive elastomer of claim 10, wherein the first lobe further includes a second surface configured to conform to the base portion.

14. A method for enhancing an electrical coupling between a top case and a bottom case of base portion of a portable computing device, the method comprising:
    providing an anodized aluminum top case and bottom case;
    coupling a clutch assembly to the top case;
    affixing a conductive elastomer to the clutch assembly;
    enhancing the conductivity of at least one region of the bottom case; and
    affixing the bottom case to the top case, wherein the bottom case contacts and deforms the conductive elastomer.

15. The method of claim 14 wherein the enhancing the conductivity of at least one region of the bottom case includes removing an anodization layer in at least one region.

16. The method of claim 14, wherein the affixing the conductive elastomer includes applying a conductive adhesive to the conductive elastomer to secure the conductive elastomer to the clutch assembly.

17. A conductive end cap for a portable computing device, comprising:
    a first surface configured to contact a first region of a base portion of the portable computing device; and
    a second surface configured to contact a second region of the base portion,
    wherein the conductive end cap is configured enhance an electrical coupling between the first region and second region of the base portion and reduce the visibility of internal components from outside the base portion.

18. The conductive end cap of claim 17 wherein the conductive end cap includes silver loaded silicone.

\* \* \* \* \*